July 4, 1967     R. H. SONNEBORN ET AL     3,329,555

POSTFORMED RESIN SHAPES

Filed July 26, 1965     4 Sheets-Sheet 3

INVENTORS
RALPH H. SONNEBORN,
FERNANDO ALVAREZ DE TOLEDO
BY & RONALD Z. BELL

ATTORNEYS

July 4, 1967

R. H. SONNEBORN ET AL 3,329,555

POSTFORMED RESIN SHAPES

Filed July 26, 1965

INVENTORS
RALPH H. SONNEBORN,
FERNANDO ALVAREZ DE TOLEDO
BY & RONALD Z. BELL

ATTORNEYS

United States Patent Office 3,329,555
Patented July 4, 1967

3,329,555
POSTFORMED RESIN SHAPES
Ralph H. Sonneborn, Newark, Ohio, Fernando Alvarez de Toledo, Crainhem-Bruxello, Belgium, and Ronald Z. Bell, Newark, Ohio, assignors to Owens-Corning Fiberglas Corporation, Toledo, Ohio, a corporation of Delaware
Filed July 26, 1965, Ser. No. 477,645
2 Claims. (Cl. 161—104)

This application is a continuation-in-part of copending application, Ser. No. 260,467, filed Feb. 25, 1963, now abandoned.

This invention relates to structural shapes made by postforming sheets of fully polymerized synthetic resins.

More particularly this invention relates to structural shapes made by postforming sheets of fully polymerized acrylic resins, reinforced with fibrous glass mats, which resins, though characterized as thermosetting, are uniquely heat-softenable in the fully polymerized state.

This invention also relates to apparatus and method for producing postformed shapes from previously produced glass fiber-reinforced acrylic resin sheets.

INTRODUCTORY

Distinction from thermoplastics

At the outset, let it be stated that the present invention does not encroach upon the prior art which relates to the forming of shapes from pure thermoplastic synthetic resins. Instead, the present invention is concerned with the formation of structural shapes from reinforced polymerized resin sheets which can be called thermosetting, but which uniquely retain a semi-thermoplastic character; and retain a substantial "plastic memory."

Distinction from postforming partially polymerized true thermosetting resins Further, at the outset, let it be stated that the present invention is clearly distinguishable from the prior art of postforming partially polymerized, phenolic, thermosetting resin systems.

The way these prior, true thermosetting phenolic resin systems work is that a preform sheet is made from the resin, but the resin is only partially polymerized, to for example 80% completion. Thus, there is a substantial degree of unpolymerized resin remaining in the sheet. This retains the sheet in a heat-softenable condition that makes postforming possible.

During the postforming operation, the heat employed to soften the sheet causes the residual polymerization to take place. This converts the unpolymerized material to a fully polymerized state. This material once "set" is forever fixed and the shape subsequently cannot be changed. Any attempt to heat-soften the postformed article will produce a useless char. This is a characteristic of a true thermosetting resin as distinguished from the present resins that are heat-polymerizable, but nevertheless have a memory and remain permanently heat-softenable even though they are fully polymerized.

In the present invention, the resin is 100% polymerized initially, before postforming, and no residual polymerization takes place during the postforming operation. Thus, the present resin systems, though characterized as thermosetting, are nevertheless heat-softenable.

The thermosetting resins of the present invention, which do not undergo residual polymerization on postforming, are therefore clearly distinguishable from the prior art thermosetting resins which do undergo residual polymerization on postforming to produce postformed shapes that are not heat softenable.

The subsequently heat-softenable, memory-type acrylic resin systems forming the subject matter of the present invention are therefore clearly distinguishable from the prior art. When the postformed shapes of the present invention are sufficiently heated, the "memory" causes them to return to the shape established before postforming.

There is thus a latent memory in a postformed shape of the present invention as distinguished from the absence of such in the postformed phenolics. In short, the shapes of the present invention will flatten out again if they are heated enough to soften them, even after the bending or postforming is completed.

Aspects of novelty

Novelty of the present invention evolves around two aspects:

(1) the use of a semi-thermoplastic, but thermosetting, resin having definite "memory"; and (2) Such resin containing wetted fibrous glass mats. The novelty of being able to bend and form such materials without rupture of the mats or without rupture of the resin itself at the bend areas provides a substantial contribution to the art. These subtleties will be brought out in the following description.

The challenge

Structural shapes such as U-channels, corrugated, and the like as for building siding, partitions, etc., can be made from glass fiber reinforced panels by curing the wet resin to shape. Thus, a wet resin lay-up comprising reinforcement mat saturated with polymerizable resin syrup and retained between impervious cover sheets can be placed on a corrugated mold for example and then placed in an oven to polymerize the resin while it is held in the desired ultimate cross sectional configuration.

This process of course requires that the production operation use different molds for every shape.

More recently, we have developed a continuous process wherein such a wet resin lay-up is preliminarily jelled to prevent resin flow in the mold; and then is pulled between floatingly compressing molds to produce a cured rigid product. It will be understood that even in this process, although a number of advantages do arise from its use, a different set of matched molds is required for every shape produced. The expense of the matched molds is justified in long run operations where the mold costs can be amortized. However, for short run items, this factor lends unprofitability and thus if a manufacturer is to produce a full product line, his higher production lines must support the loss leaders.

Also several factors arise in addition to mold costs; and because of different mold sets required for each shape. In this process, when a mold change is required, losses are incurred in addition to product loss as follows:

(1) *Resin loss.*—When the line is shut down, the resin system is upset. Since the resin is cured by chemical accelerators and catalyzers in combination with heat, the resin mix has a relatively short pot life. Accordingly, the resin in the system must be dumped during shut down to prevent pot jell that would otherwise take place during a mold change.

(1a) Additionally, all resin along the line at the time of mold change that has not been converted to finished product is lost. This is analogous to changing from clear to tinted glass and back, in a continuous glass melting tank; or in changing alloy in a continuous steel melting operation.

(2) *Down time.*—The production line must be shut down in order for the mold change to be made. This and the labor involved in making the mold change obviously contribute to higher cost products, or if a manufacturer is to remain competitive, to a much lower profit margin.

(3) *The resin system is upset.*—Dumping the resin requires that the line be restarted and brought to equilibrium; thus the resin system must be stabilized for production of a satisfactory product. This entails loss of materials until conditions have been again stabilized to the production of acceptable products.

*Advancement of the art by production of a stock shape and postforming*

In view of the foregoing, it is believed that a substantial advance to the art would be provided by novel postformed shapes, apparatus and method of production. Thus, if postformed shapes of a wide range of configurations for different applications could be made from stock sheet materials, a substantial advance to the art would be provided. This would provide stabilized production of sheet stock without mold change; without upsetting the resin system; without product loss during start up; and without down time and labor cost for mold change.

*Objects*

Accordingly, it is an important object of the present invention to provide novel postformed structural shapes such as corrugated panels, U-channels and the like.

A further object is to produce novel postformed shapes such as corrugated panels, from previously formed sheets of fully polymerized acrylic resin systems, reinforced with glass fibers.

A further object is to provide apparatus for producing postformed shapes from heat-polymerized acrylic resin systems of a semi-thermoplastic nature and exhibiting substantial memory.

A further object is to provide a process for postforming such reinforced synthetic resin sheet materials.

A further object is to provide a process for postforming reinforced synthetic resin acrylic sheet materials, that can be integrated with a continuous sheet forming production operation.

A further object is to provide a process for producing postformed shapes from fully polymerized fibrous glass-reinforced acrylic resin sheets of semi-thermoplastic nature.

Other objects of this invention will appear in the following description and appended claims, reference being had to the accompanying drawings forming a part of this specification wherein like reference characters designate corresponding parts in the several views.

FIGURE 1 is a composite of FIGURES 1a, 1b, 1c and 1d;

Before explaining the present invention in detail, it is to be understood that the invention is not limited in its application to the details of construction and arrangement of parts illustrated in the accompanying drawings, since the invention is capable of other embodiments and of being practised or carried out in various ways. Also, it is to be understood that the phraseology or terminology employed herein is for the purpose of description and not of limitation.

*Perspective view*

As a brief guide for the description which follows, the following aspects of the invention will be initially highlighted.

(1) *The article.*—An important aspect of the present invention is the postformed shape itself which is made from a fully polymerized acrylic resin sheet containing a reinforcement of resin-wetted fibrous glass mat. When it is realized that there is substantial difficulty in forming bends in this type of material, with commercially acceptable smooth corners and without rupturing the reinforcement material due either to the presence or absence of resin flow during bending, and without rupturing the resin, it will be evident to those skilled in the art that patentable contribution is presented. The product is characterized by interrelated thicknesses and radii of bends.

(2) The apparatus involved in producing the foregoing product and in handling a semi-thermoplastic fully polymerized glass fiber-reinforced acrylic resin sheet material is unique by the type of bending that it can produce, and by the kinds of materials of which made.

(3) Processing techniques relative to this unique material, that is, glass fiber-reinforced acrylic resin systems, including forming pressures, residence times, heat-treating temperatures and the like, due to their interrelated complexity, necessarily give rise to patentable invention in a process capable of their control.

In view of the foregoing, a comprehensive description of all three phases of the invention will now follow substantially in the order set forth above.

*The article of invention*

Figure 1A:
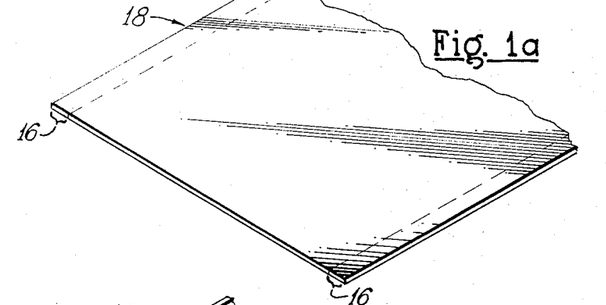
FIGURE 1a is a fragmentary perspective illustration of a sheet of acrylic resin containing fibrous glass mats, used as infeed for the invention.
Figure 1B:
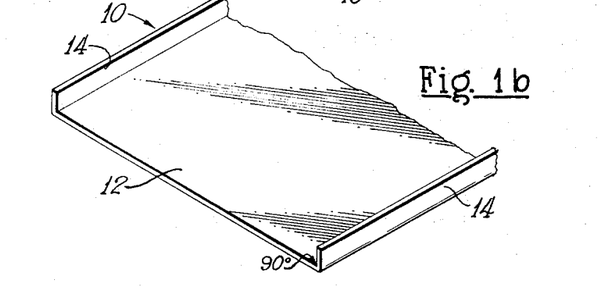
FIGURE 1b is a fragmentary perspective view of a postformed channel made according to the invention.

By referring to FIGURE 1b, it will be noted that a typical product in accordance with the present invention is that of a U-shaped panel as for building siding, partitions and the like. Of course it is to be understood that this is a typical shape within the total scope of invention and is not to be considered limiting when taken in the light of the following disclosure.

In FIGURE 1b the piece is designated by the reference numeral 10 and includes a web 12 of planar configuration. Upstanding sides 14 are formed by bending upwardly the terminal edges of the initially flat panel along the bracketed areas 16 of the sheet 18 of FIGURE 1a.

Figure 2:
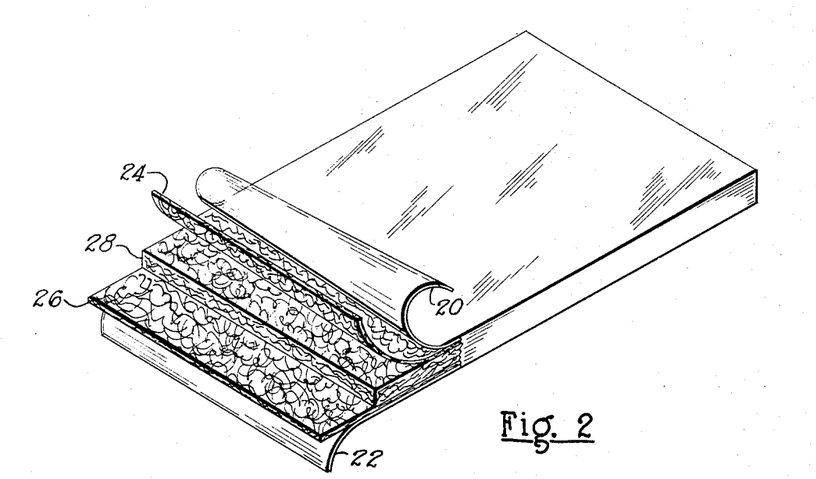
FIGURE 2 is a fragmentary perspective view of a panel infeed material, broken away to show component parts.

Thicknesses of sheet 18, as shown in the product of FIGURE 2, wherein a substantial amount of glass reinforcement material is comprised in the laminate stock, are in the range from about .037 inch to about .100 inch. When operating with this thickness range of materials, it has been found that minimum radius of bend of approximately ⅛" is established. In producing sharper bends, there is excess resin flow with wrinkling along the inside of the bend, and depending upon the type of bending employed, whether bending, tucking (pressing or press forming) or roll over, reinforcement mat breakage and fiber to resin bond rupture become factors of prime consideration.

Figure 1C:
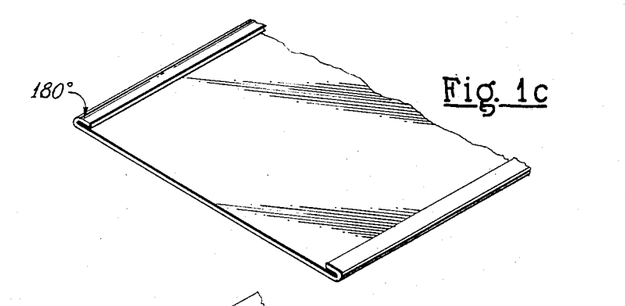
FIGURE 1c is a fragmentary perspective view of a panel of invention having 180° overturned edges.
Figure 1D:
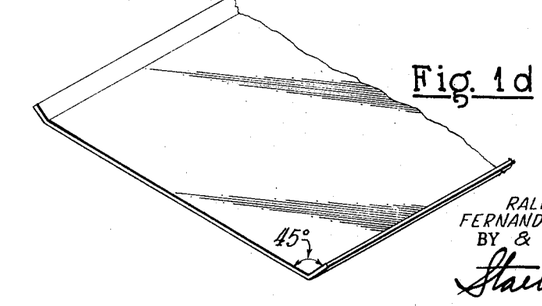
FIGURE 1d is a fragmentary perspective view of a panel having 45° upturned edges, made in accordance with the invention.

As shown in FIGURE 1d, 45° bends are also to be encompassed within the extended scope of invention.

Still further, as shown in FIGURE 1c, 180° bends are within the scope of invention. It should be pointed out that relative to the 180° bends, minimum thickness of about .045 inch is required to prevent surface resin damage as distinguished from .037 inch for 45° and 90° bends.

It should be pointed out that where a sufficient minimum radius is retained, performance of the products has proven entirely satisfactory.

In the light of the foregoing product shape description, it is pertinent at this point to describe the several factors and components involved in the feed material which are controlled and manipulated by the invention. These are illustrated by reference to FIGURES 2, 3 and 4.

*The complexity of the system as distinguished from a pure thermoplastic resin*

By reference to FIGURES 2 and 3 of the drawings it will be noted that the components of the system making up the feed stock are as follows:

(1) *The top and bottom cover films.*—These are designated 20 and 22; and are customarily of cellophane or acetate. Their function is to retain the resin syrup in proper position during the formation of the laminate. As a usual thing these are readily stripped from the finished sheet. This factor however requires careful control in forming bends in the sheets in accordance with the invention. Thus it is necessary to retain these elements in position on the panel to avoid scarring the surfaces of the product during handling. Thus to retain them in place during processing without skinning off is an important factor which is controlled by correlating thickness with minimum radius of bend.

Figure 3:
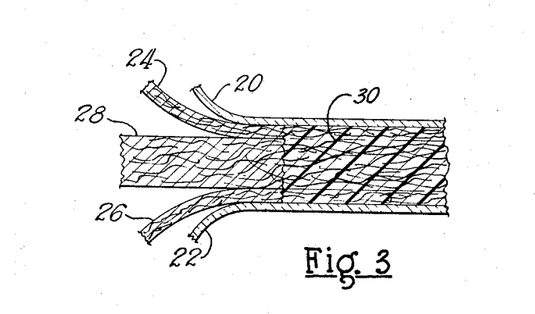
FIGURE 3 is a fragmentary side elevation of FIGURE 2.

(2) *The surface mats.*—In FIGURES 2 and 3 these are designated 24 and 26. These comprise web-like elements of glass fibers of relatively small diameter. Their purpose is to hold a coating or thin layer of pure resin at the surface of the panel to impart durability and weather resistance. If the resin layer at the surface is too thin or missing, surface erosion by weathering and abrasion will result; if the fibers are exposed, the aesthetic appearance of the product is ruined. Aditionally, the fibers will erode away and ultimate destruction of the panel results.

In the panels, these surface fibers are thoroughly wetted by the resin; therefore, there is a strong bond between the fibers and resin. Accordingly, the fibers and resin must be formed together else the bond will be broken and visible defects and weaknesses will result.

From the foregoing, it will be evident that the surface mats are very delicate, and accordingly to preserve integrity in them and in the thin film of resin at the surface of the sheet, very delicate control in the postforming within the correlated limits of panel thickness and minimum radii set forth above are required.

(3) *The reinforcement mat.*—This is designated by the reference numeral 28 and preferably is comprised of continuous strands interfelted in random array. These mats are of heavier weight than the surface mats and are therefore of greater strength for reinforcement of the product. Inasmuch as the strands are thoroughly wetted by the resin, it will be evident that a strong bond is provided between them and the resin. Accordingly, these strands and the resin must be formed together like the surface mats and resin—else the bond will be broken and visible defects and weakness result.

(4) *The matrix resin.*—This is designated by the reference numeral 30 and comprises a substantially completely polymerized acrylic resin system. This is characterized in its polymerized state as a relatively stiff and hard material which is of a semi-thermoplastic nature, and after being bent retains a substantial memory. Therefore, although the resin can be heated and shaped, because of its memory, it will fracture and flow unless properly manipulated. In order to produce acceptable products this also must be carefully controlled.

*Control of the complex system*

Figure 4:
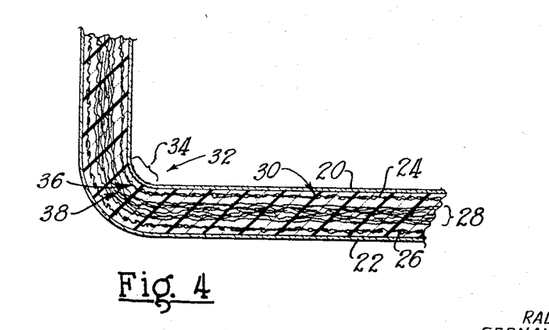
FIGURE 4 is an enlarged fragmentary section of a right angle bend made by the invention.

As shown in FIGURE 4, the products of invention are characterized by substantially smooth radii of curvature at the bends, as at the inside of the bend 32. In this figure it will be noted that some slight flow and crinkling of the surface resin may be evident on the inside of the bend, as at the area 34. This is caused by flow of the surface resin as the mat materials 24, 26 and 28 are all tensioned and compressed during flow of the bend. However, it will be noted that there is no breakage of the surface of the resin and thus no production of cracks at the surface.

Further it will be noted that there is ever so slight a puckering of the inner surface mat at 36. However, neither the fibers nor the resin-fiber bond are broken when the product is properly formed. Instead a gentle flow is provided.

Further, it will be noted that there is ever so slight a puckering of the inner portion of the reinforcement mat as at 38. However, neither the strands of the mat nor the resin-fiber bond are broken when the product is properly formed, within the limits set forth.

In view of the foregoing, the importance of correlation of radius of bend to thickness of sheet will be evident.

In general, the following define the parameters of invention:

(1) Thickness range of stock 0.037–0.100 inch;
(2) Bending range 1–180° inclusive;
(3) Bending radius ⅛″ minimum to prevent surface resin cracking and reinforcement mat rupture.

*Resins applicable to the products of invention*

An advantageous resin system for the formation of postformed products in accordance with this invention utilizes a combination of peroxides including:

(a) lauroyl peroxide
(b) methyl ethyl ketone peroxide
(c) tert-butyl peroxypivalate
(d) tert-butyl peracetate One complete resin and catalyst system includes the following ingredients in the proportions indicated:

| Component— | Parts |
|---|---|
| Acrylic resin syrup (25% by weight of polymethylmethacrylate dissolved in 75% by weight of methylmethacrylate monomer) (Du Pont Lucite #205) | 100 |
| Methylmethacrylate monomer | 10 |
| Lauroyl peroxide, percent | 0.8 |
| Methyl ethyl ketone peroxide, percent | 0.16 |
| Tert-butyl peroxypivalate, percent | 0.72 |

Another resin system is as follows and employs either straight tert-butyl peroxypivalate or accelerator modified tert-butyl peroxypivalate as the catalyst. This system is as follows:

| Component— | Parts |
|---|---|
| Acrylic syrup, Du Pont Lucite #205; 25% by weight of polymethylmethacrylate dissolved in 75% by weight of methylmethacrylate monomer | 100 |
| Methylmethacrylate monomer | 12 |
| Tert-butyl peroxypivalate, percent | 0.5–1.5 |

A third resin system is also useful in the invention. This is as follows:

| Component— | Parts |
|---|---|
| Acrylic resin syrup, Du Pont Lucite #205; 25% by weight of polymethylmethacrylate dissolved in 75% by weight of methylmethacrylate monomer | 100 |
| Methylmethacrylate monomer | 12 |
| Tert-butyl peroxypivalate, percent | 0.5–1.5 |
| Accelerator 6 (Du Pont product comprising organic and inorganic chlorides in methanol and higher boiling alcohols) | $1.25 \times 10^{-4}$ |

The foregoing resin formulations can be combined with glass fiber reinforcement mats and surfacing mats to produce sheets, polmerized to fully cured state in the flat form.

It is believed that the present invention provides a substantial contribution as regards these resin systems; and extension of the invention within reasonable limits is suggested. When attempts are made to process HET-acid polyesters or styrene-polyesters, the result is breakage however. Breakage is also encountered in attempts to bend fully cured sheets of phenolic resins, as discussed in the introductory portion of this specification.

Accordingly, acrylic resin systems containing glass fiber reinforcement appear to be closely correlated to the unique products, apparatus and process set forth herein. It is believed that the system can be broadly defined as follows:

| Component— | Parts |
|---|---|
| Acrylic resin syrup (25% by weight of polymethylmethacrylate dissolved in 75% by weight of methylmethacrylate monomer) | 100 |
| Methylmethacrylate monomer | 10–12 |
| Catalyst system, percent | 0.5 to about 1.5% |

Advantages inherent in the products of invention

A distinct advantage and improvement of postformed shapes made in accordance with the present invention arises from the fact that a uniform fiber-reinforcement ratio is provided at sharp radii. This is contrasted to prior art polymerizing "in shape." Thus, by the prior art, when a wet lay-up or wet laminate is bent sharply, the resin exudes from the bend and flows away, resulting in reduced thickness. The resin flow naturally causes reinforcement mat wash and removal. The higher the gel the worse the latter condition becomes. The result is weak radii.

Durability of the products of invention

In a fourteen month weathering test, no noticeable changes to the panels are discernible. This experimental test was conducted on an exterior exposure rack where the panels were exposed to the elements of the atmosphere.

Product usage

Products of the invention are adapted for use in surroundings where ambient temperatures will not result in softening sufficient to release the plastic memory of the resin. Thus, maximum service temperature of about 120° F. is developed where the bent section is left unsupported. However, if the bend is supported in some manner to prevent the natural tendency to flatten, higher temperature exposures can be tolerated. However, the maximum exposure should not exceed about 200° F. since the resin begins to soften at this level, and internal expansion may result and heat stress wrinkles appear where the panel is supported.

In general, it can be stated that subjecting panels to room temperature indoors seems to have no effect on the stability of a postformed piece. Several samples exposed for four weeks have shown no change and another sample exposed for ten months has also shown no deviation from its original postformed shape.

The apparatus of invention

Figure 5:
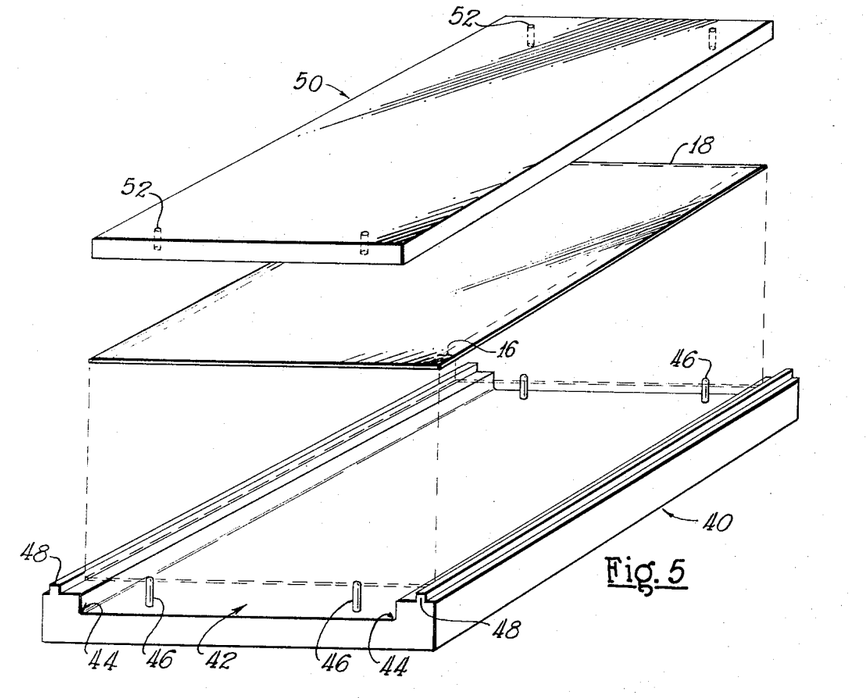
FIGURE 5 is an isometric view of a mold of invention, exploded, and showing relation of sheet to be formed.
Figure 6:
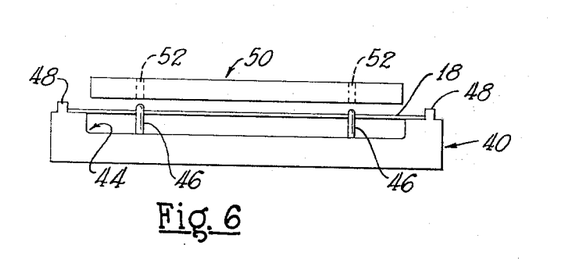
FIGURE 6 is an end elevation of FIGURE 5 with parts closer together.
Figure 7:
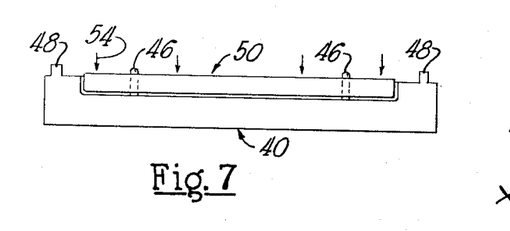
FIGURE 7 is an end elevation similar to FIGURE 6 with the male mold in a position to postform the sheet.

This is best shown in FIGURES 5, 6 and 7 of the drawings. This system eliminates heat stress and allows production of twenty or more pieces per hour.

Briefly, the apparatus comprises a lower mold element 40 of essentially rectangular section and having an elongated cavity 42 formed in its upper surface. It will be noted that the cavity 42 is of essentially rectangular section to define the external contour of the postformed piece. This is analogous to a die used in forming steel stampings or to matched metal molds used in forming reinforced resin products. We will refer to the elements 40, 42 combination as the female mold portion. It should be pointed out however that the radii 44 are a minimum of 1/8".

At each end of the elongated cavity 42 are dowel or gauge pins 46. These are spaced apart greater than the length of the panel to be shaped, and serve to align the male mold in properly guided relation into the cavity.

Guide strips 48 are placed along the edges of the elongated cavity 42 and align the heated sheet stock 18 over the cavity before the male mold element is applied to postform the sheet.

The male mold comprises an elongated block of rectangular section designated 50. This block has apertures 52 at each end to receive the pins 46.

The end elevation of FIGURE 6 shows the manner in which the heated sheet 18 is laid between the guide strips 48 prior to application of the male mold 50.

FIGURE 7 illustrates the finished piece while cooling in the mold, with postforming forces retained along arrow lines 54.

The forming operation is conducted by first heating the panel in an oven; and while at a proper temperature, removing from the oven and placing between the guide strips 48. The male mold 50 is then positioned on the pins 46 and pressure applied to "tuck the edges 16 into place" or to press the central portion 12 FIGURE 1 down into the elongated cavity 42 of the bottom female mold element 40.

The position of components in FIGURE 7 is retained while the finish piece is cooled in the mold to room temperature.

It should be pointed out that the materials of which the mold elements 40 and 50 are made are characterized by a relatively low coefficient of heat-transfer. The function of this material is to reduce shock when the parts are brought together. Thus a rather slow cooling to set condition is provided, and results in strain-free articles.

The extended scope of invention would include metals for the molds. However, when so operating, it is desirable that the mold temperature approximate that of the hot laminate to avoid shock. Slow cooling will thereby follow. It will be evident that the necessary heating and cooling will slow the cycle as compared to the preferred materials, such as fibrous board, plywood, or the like, which can contact the piece without damage at substantially differing temperature. From the foregoing it is important that an annealing-type cooling be utilized that prevents stresses in the body and wrinkles in the surface of the piece.

The elements of the apparatus are believed to be novel because of the following features:
 (a) Materials of which made;
 (b) Containing critical radii; and
 (c) Providing restraint to the softened piece while it is cooled to an immobile condition in a manner preventing stress and avoiding surface wrinkles and distortion.

Extension of invention relative to apparatus

While the apparatus disclosed above is highly important to certain shapes and bends, other apparatus can be used within the extended scope of invention relating to lesser critical bends. Thus, bending apparatus and roll over apparatus can be used in addition to the tucking or press apparatus disclosed above.

For example, 45° angles with a minimum radius of 1/8" are satisfactorily produced with a bending apparatus, typified by a conventional sheet metal brake. Generally the product is satisfactory, but there is often a slight reinforcement cracking as evidenced by photomicrograph. The best 45° bends are made on the apparatus shown, and are characterized by no reinforcement cracking.

90° bends are sometimes satisfactorily made with bending apparatus but are characterized by some reinforcement cracking. By using the wood mold operation described above, the radii are sometimes slightly rougher due to resin flow and reinforcement displacement; however, there is no reinforcement rupture and it is therefore believed that the operation according to this aspect of the invention is unique for production purposes. This is the reason why the apparatus has been substantially described and emphasized.

180° bends can be made by bending apparatus where the resin sheet has a minimum thickness of about .045 inch. In lesser thicknesses, resin and reinforcement rupture are apparent.

By using the forming apparatus described, however, the thickness can extend as low as .037 inch to give good resin integrity, but with some reinforcement rupture. In a .045 inch thick panel, 180° bends can be satisfactorily made by utilizing a shaping operation with the apparatus described where the male mold is removed and the vertical upturned edges folded on over in a second die operation.

Heating

It has been found that an infra-red oven is preferred to get good heating, extending clear to the center of the piece before molding. A convection oven has been found operable, but the difference between the two is mentioned to point out the greater desirability of the infra-red oven.

As an aside, it should be pointed out that the panel can be heated in an oven in the manner of the setup of FIGURE 6; and the FIGURE 7 position of parts then developed in the oven; and then removed for the cooling.

It should be pointed out that no restrictive influence such as clamping plates should be applied during the warm up process. These result in a differential heating and cooling of the panels and will induce stress marks in the surface and also increase the preheat cycle. Therefore, it is to be emphasized that panels for processing in accordance with the present invention are heated to their softening temperature in a free and unstressed condition. They are then transferred to a forming jig and postformed at a level not dropping below postforming temperature, and thereafter cooled while retaining the postforming forces.

The best way to postform a panel to retain the surface free of heat stress wrinkles is to heat the panel to its softening point uniformly and without insulation covering, i.e. by direct exposure to the heat source, and this preferably an infra-red source.

In view of the clamp pressures alluded to above, where compound bends are to be made, operability in accordance with the present invention is provided by forming all bends simultaneously. Thus, to form a first bend and set it and then to hold this while heating the panel again to resist the plastic memory of the piece at the first bend, and then form the second bend, results in the heat stresses alluded to above. Accordingly, simultaneous formation of all bends is desirable.

It should be pointed out that panels containing materials other than fibrous reinforcement mats form much more readily than the reinforced materials discussed herein. Thus, materials such as acrylic systems containing glass flake, particularly milled flake, and similar fillers as distinguished from reinforcement materials, postform essentially in the manner of the pure resin and appear to us to be a part of the prior art. However, the concept of the present invention is novel as regards the postforming of fiber reinforced materials wherein there is a tight resin-to-fiber wetted bond.

The invention is not to be limited to glass mats of continuous fibers. Thus chopped strand mats are within the extended scope of invention.

It is to be understood that shapes other than those shown are within the scope of invention. Thus, corrugated panels and the like can be produced and molds having such configuration are therefore encompassed.

The process

Figure 8:
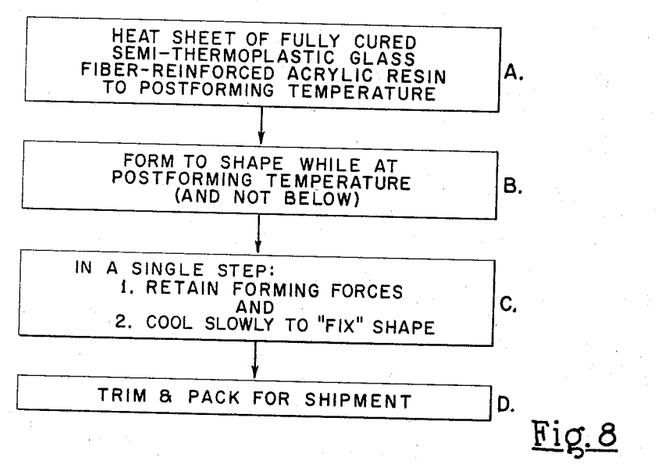
FIGURE 8 is a schematic illustration of the process of invention.

In FIGURE 8, a schematic flow diagram is provided, illustrating the various steps involved leading to the novel products of invention. It will be noted that the various method steps involved within the total scope of invention include the following:

(a) Heating a sheet of fully cured semi-thermoplastic fibrous glass reinforced acrylic resin to postforming temperature;

(b) Postform to shape while at postforming temperature and not below;

(c) In a single step, (1) retain the postformed configuration and postforming forces; and (2) cooling slowly to fix the shape;

(d) Trim and pack for shipment as necessary.

In the light of this brief outline, a full and complete description of each stage and the coordination of the stages in the process will now be provided.

Step A—Heating the sheet

As has been pointed out, the present invention is applicable to fully polymerized and fully cured semi-thermoplastic acrylic resin systems containing fibrous glass mats. It is important that the piece be heated in a free state and in an unstressed condition, without restriction. Also, the temperature range for practical matters is rather carefully observed. As has been discerned by the actual embedding of a thermocouple in a panel, the specific softening temperatures of these resin systems is substantially 220° F. To attain this temperature, panels of the thickness described, that is in the range of .035 to .100 inch, can be subjected to a temperature in the broad range of 300 to 380° F. for a residence time in the range of about three to five minutes. More particularly, the temperature range of 320 to 340° F. for a four minute dwell provides an ideal production cycle. Due to the low thickness of the panel, it comes to temperature rather readily, thus providing high production.

Thus, a broad temperature range of 300 to 380° F. and more particularly 320° to 340° F., forms the general scope of invention.

Further, a dwell at heating temperature in a broad time range of three to five minutes and a particular time of about four minutes illustrates the general scope of invention.

Step B—Form to shape while at postforming temperature

The reader will ask why the heating temperatures are above the 220° F. softening temperature of the resin. This is to allow transfer from the oven to the forming mold. Even with this lead, it has been found that the forming must take place within 30 to 45 seconds of removal from the oven because of the rapid heat loss from the large surface area of the panel.

This is the reason the foregoing description relative to the apparatus included the proposition that the heated part could actually be shaped in the mold within the oven and then the molded part and mold removed for cooling to set the shape.

In any event, no matter how it is done, it is important to form at the softened stage or softening temperature of the resin. If the resin is too cold, breakage will result particularly with sharper bends.

The principal factors to be considered in forming are:

(1) Minimum temperature of forming; or softening temperature of 220° F. This may vary slightly depending upon different resin systems.

(2) Heating at a temperature below which the resin will decompose to provide monomer boil.

Relative to this last factor, it has been found that prolonged exposures to temperatures greater than about 340° F. cause degradation of the polymer to the monomer; and the monomer will produce boil.

(3) *Bending speed.*—As has been mentioned above, it is important to bend at softening temperature. Partically this means bending within 30 to 60 seconds after removal from the oven to an ambient temperature condition (room temperature). A closer approach to the ultimate is bending under absolutely stabilized heat conditions as in an oven; and then cooling while holding the postforming conditions of force and shape configuration.

Step C—In a single step (1) Retain postforming forces; and
(2) Cool slowly to "fix" shape.

The elements of this step are substantially self-explanatory. Because of the memory of the resin, it is important to retain postforming forces while cooling the resin to fix the shape. The slow cooling has been found effective to eliminate molding stresses.

Step D—Trim and pack for shipment

This is self-explanatory.

Extended scope of invention relative to process

*Multiple bends.*—These are preferably performed simultaneously because of the "memory" of the resin. Multiple-stage bending materials has been found to be extremely difficult because of the plastic memory of the material. If a first bend is made, it must be held during subsequent reheating and as mentioned above, the holding results in holding-heat stresses and wrinkles.

*Integration aspects.*—While the process described above has stature of its own, it can be tied in very effectively with a prior production operation. In our continuous forming process referred to above, it was stated that panels useful as starting materials for the present invention are advantageously produced by pre-gelling and then drawing the gelled layup through a floating mold set-up as it passes through the polymerization exotherm. In the prior process the molded unit is then passed through a postcure oven to complete the polymerization and reduce monomer content to a minimum level of about 1%.

Although this postcuring involves heating, the heating is below that at which softening of the part takes place, to wit, 220° F.

However, though the temperature level is lower than softening for purposes of postforming, advantage can be taken of the residual heat as far as production economy and tie-in with the postforming operation of the present invention are concerned.

Such an integrated process would thus comprise initially forming the sheet flat by gelling and then molding at polymerization temperature by passing the system through an exotherm of polymerization, and then post-curing by heat soaking. To provide a completely integrated process of producing any shape wanted, an extension could be placed on the postforming oven to bring the temperature on up to postforming temperatures set forth above, so that the postforming thereafter could be effected. The advantage of such system is that the heat of the postcure becomes in effect part of the heat for softening for the postforming operation, making a perfect blend between production in the flat and postforming to any desired shape. Thus, production is continuous and flat sheets can be postformed immediately. By so operating, the production line is stabilized and such stabilized conditions are never upset as by mold change during initial forming. Accordingly, a substantial contribution to the art is provided.

Typical example

An actual example of postforming in accordance with the present invention is as follows:

A flat sheet made of acrylic resin syrup comprising 25% by weight of polymethylmethacrylate dissolved in 75% by weight of methylmethacrylate monomer (Du Pont Lucite #205) and methyl methacrylate monomer, polymerized to substantially 1% residual monomer state was placed in a heated oven in an unrestricted state upon a flat metal sheet. The oven was maintained at a temperature of 340° F. and after five minutes the piece had attained a 220° F. internal temperature as evidenced by an embedded thermocouple. The heated piece was removed from the oven and transferred to a forming mold shown in FIGURES 5, 6 and 7, and within a time cycle of 45 seconds after removal from the oven, was formed to the U-channel shape shown in FIGURES 7 and 1b. Clamping pressures were applied and held until the postformed piece had reached a temperature of less than 100° F. A mold dwell time of about three minutes was required.

Figure 9:
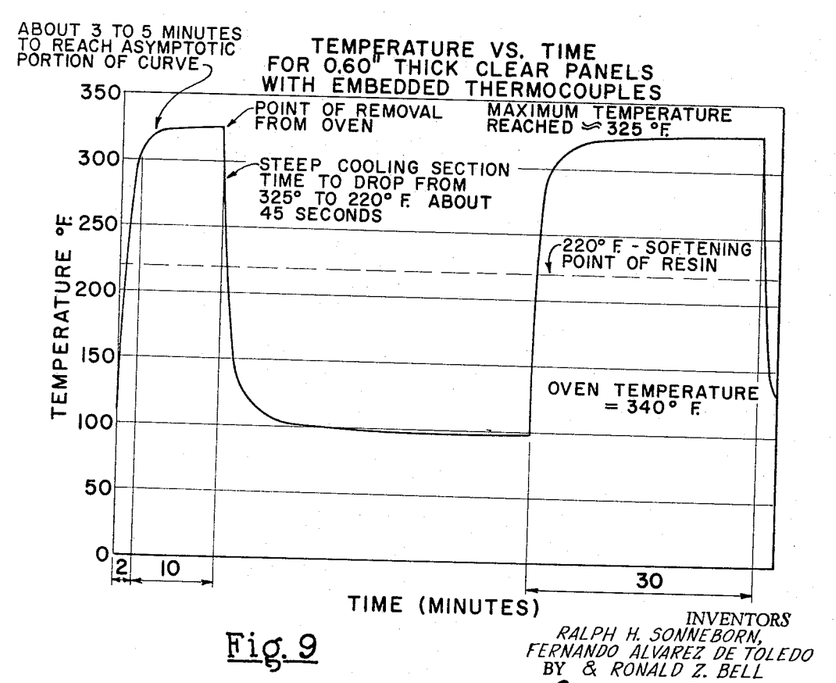
FIGURE 9 is a graph illustrating the heating and postforming cycle.

The results of studies utilizing a thermocouple embedded in the panel are shown in FIGURE 9 of the drawings. This illustrates that after about three to five minutes at an oven exposure temperature of 340° F., the panel reaches the asymptotic portion of the curve and that additional time at this exposure temperature does not appreciably increase the internal temperature, a maximum of 325° F. being registered. After the point of removal from the oven, steep cooling follows because of the thin section of the shape. The temperature drops from 325° F. to about 220° F. in about 45 seconds. Thus, the piece must be transferred from oven to mold where the mold is in ambient surroundings within this time limit. And further, forming must take place before the panel passes downwardly through the 220° threshold.

Advantages of the invention

It will be evident from the foregoing that processing improvement arises from forming in the flat on an uninterrupted basis without ever having to change the molds and then postforming in small or large quantities with modest tool cost; and in either event making the profit break even point on postforming mold cost economically feasible for extremely short runs and the long run tooling cost practically nil when spread over a larger number of units.

A further advantage of the invention is that it eliminates matched dies in the original forming operation. Further, since the molds used in postforming are extremely economical to produce, further cost reductions are provided.

An aspect of this invention which should also be highlighted relative to the process is the control in handling of a resin and reinforcement material system. Novelty arises from the ability to manipulate such a system without excess resin flow and without rupture of the reinforcement and surface mat materials. Thus, an important advantage of the invention is to shape an acrylic resin-fibrous glass complex into a bend while restricting resin flow and preventing fiber breakage; or said otherwise, to bend while preserving a static or substantially static condition of the component parts of the complex relative to one another.

We claim:

1. In a postformed sheet comprising a fully polymerization-hardened acrylic resin matrix and having edges,
    said sheet having opposed major surfaces extending between said edges and thin fibrous glass mats in said matrix immediately below each of said surfaces,
    a reinforcement mat in said matrix between said surfacing mats,
    and said mats being distributed uniformly throughout the thickness of said sheet and the fibers thereof being in wetted relationship with said matrix,
    said sheet having a substantially uniform thickness in the range from about .037–.1 inch,
    a bend at, at least, one of said edges in the range from about 1° to about 45°, inclusive, and the bend having a minimum radius of ⅛",
    and said bend having a smooth contour and radius including continuous resin matrix and wetted fibers and being of substantially equal thickness to that of the article in the nonbend areas.

2. In a preformed sheet comprising a fully polymerization-hardened acrylic resin matrix and having edges,
    said sheet having opposed major surfaces extending between said edges and thin fibrous glass mats in said matrix immediately below each of said surfaces, a reinforcement mat in said matrix between said surfacing mats, and said mats being distributed uniformly throughout the thickness of said sheet and the fibers thereof being in wetted relationship with said matrix, said sheet having a substantially uniform thickness in the range from about .045–.1 inch, a bend at, at least, one of said edges in the range from about 1° to about 180°, inclusive, and the bend having a minimum radius of ⅛ inch, and said bend having a smooth contour and radius including continuous resin matrix and wetted fibers and being of substantially equal thickness to that of the article in the nonbend areas.

References Cited

UNITED STATES PATENTS

| | | |
|---|---|---|
| 2,468,094 | 4/1949 | Marks. |
| 2,992,203 | 3/1957 | Protzman. |
| 3,084,068 | 4/1963 | Munn _____________ 260—89.5 |

MORRIS SUSSMAN, *Primary Examiner.*

E. M. BERGERT, *Assistant Examiner.*